(12) United States Patent
Yoon et al.

(10) Patent No.: US 6,835,531 B1
(45) Date of Patent: Dec. 28, 2004

(54) PHASE CHANGE OPTICAL DISC

(75) Inventors: Du-seop Yoon, Suwon (KR); Yong-jin Ahn, Seoul (KR); Chang-min Park, Suwon (KR); Yoon-ki Kim, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 09/620,469

(22) Filed: Jul. 20, 2000

(30) Foreign Application Priority Data

Jul. 20, 1999 (KR) ........................................ 1999-29278

(51) Int. Cl.[7] ................................................. G11B 7/24
(52) U.S. Cl. ................ 430/270.13; 430/945; 428/64.5; 369/275.2; 369/275.5
(58) Field of Search ............................. 430/270.13, 945; 389/275.5, 275.2; 428/64.5, 64.6; 369/275.2, 275.5

(56) References Cited

U.S. PATENT DOCUMENTS

| | | | |
|---|---|---|---|
| 5,255,260 A | * 10/1993 | Yamada et al. | 369/283 |
| 5,348,783 A | * 9/1994 | Ohno et al. | 430/270.13 |
| 5,419,999 A | * 5/1995 | Uejima | 430/945 |
| 5,569,517 A | * 10/1996 | Tominaga et al. | 430/270.13 |
| 5,604,003 A | * 2/1997 | Coombs et al. | 430/270.13 |
| 5,761,188 A | * 6/1998 | Rosen et al. | 369/275.2 |
| 5,768,221 A | * 6/1998 | Kasmi et al. | 369/284 |
| 5,786,117 A | * 7/1998 | Hoshi et al. | 430/270.13 |
| 5,981,014 A | * 11/1999 | Tsukagoshi et al. | 428/64.5 |
| 6,181,650 B1 | * 1/2001 | Ichihara et al. | 369/13 |
| 6,190,750 B1 | * 2/2001 | Wierenga et al. | 430/270.13 |
| 6,329,036 B1 | * 12/2001 | Kikukawa et al. | 430/270.13 |

FOREIGN PATENT DOCUMENTS

| | | | |
|---|---|---|---|
| JP | 03-157830 | * 7/1991 | |
| JP | 5-258345 | 10/1993 | |
| JP | 6-251422 | 9/1994 | |
| JP | 8-63789 | 3/1996 | |
| JP | 9-17028 | 1/1997 | |
| JP | 09-007224 | * 1/1997 | |
| JP | 9-128807 | 5/1997 | |
| JP | 11-134713 | * 5/1999 | 430/270.13 |

OTHER PUBLICATIONS

Machine translation of JP 09–007224.*

* cited by examiner

Primary Examiner—Martin Angebranndt
(74) Attorney, Agent, or Firm—Staas & Halsey, LLP

(57) ABSTRACT

A phase change optical disc that has a multilayer structure. The structure is sequentially laminated on the transparent substrate starting with a first dielectric layer; a phase control layer, the phase control layer having two areas are defined in a laser spot in which the irradiation with a reproduction beam causes a phase difference that alters the optical path of the reflected reproduction beam passing through the areas; a second dielectric layer; the phase change recording layer, which reversibly converts between a crystal phase and an amorphous phase by irradiation with a recording beam; a third dielectric layer; a reflective layer; and a protective layer. An alternative embodiment includes a fourth dielectric layer disposed between the reflective layer and the protective layer. The information of a recording mark can be accurately reproduced due to the phase difference between adjacent areas on the phase control layer, thereby reducing the size of the effective spot of the reproduction beam. Accordingly, the mixing of the signals between adjacent marks or adjacent tracks is decreased, thereby realizing a high density optical disc and improving the resolution power of a reproduction signal.

15 Claims, 3 Drawing Sheets

A: APERTURE AREA
D: MOVING DIRECTION OF DISC
T: DISTRIBUTION OF TEMPERATURE OF DISC PHASE CHANGE LAYER
M: MASK AREA
LS: LASER SPOT
TP: TRANSITION POINT
I: INTENSITY OF BEAM
P: PIT OR MARK

PHASE CHANGE OPTICAL DISC

CROSS-REFERENCE TO RELATED APPLICATIONS

This application claims the benefit of Korean Application No. 99-29278, filed Jul. 20, 1999, in the Korean Industrial Property Office, the disclosure of which is incorporated herein by reference.

BACKGROUND OF THE INVENTION

1. Field of the Invention

The present invention relates to a phase change optical disc, the phase control layer of which has an optical characteristic varying with laser beam irradiation, and more particularly, to a phase change optical disc, the resolving power of which is improved to allow high density optical recording, even if the size of a recording mark is reduced as the density of the optical disc increases.

2. Description of the Related Art

Phase change optical discs are optical information recording media on which information can be written, and from which information can be reproduced and erased by irradiation with laser beams. For phase change optical discs, an optical head can easily be constructed, and simultaneous recording and removal (i.e., overwriting) can be easily performed. For this reason, there has been research and investigation into increasing the density of a phase change optical disc.

FIG. 1 is a vertical cross sectional view of a typical phase change optical disc. Referring to FIG. 1, a conventional phase change optical disc 10 has a multilayer structure in which a first dielectric layer 12, a phase change recording layer 13, which is formed of a phase change material whose optical characteristic varies with irradiation of a recording beam, a second dielectric layer 14 and reflective layer 15, are sequentially laminated on a transparent substrate 11, which is formed of, for example, acrylic acid resin or polycarbonate (PC).

In this multilayer structure, the first and second dielectric layers 12 and 14 are typically formed of $ZnS$—$SiO_2$. The phase change recording layer 13 is formed of $Ge_2Sb_2Te_5$. The reflective layer 15 is formed of aluminum (Al) or an aluminum alloy.

Information is recorded on or reproduced from this conventional phase change optical disc 10 having a multilayer structure. This is based on its characteristic that a part of the phase change recording layer 13, on which a laser beam is applied, becomes a crystalline or amorphous state depending on the power of the incident laser beam and the cooling speed, and thus the optical characteristic of the phase change recording layer 13 is changed. Information is recorded by generating a recording mark by melting the phase change recording layer 13, which is initialized to a crystal phase by laser beam irradiation, using a recording pulse of high power and then rapidly cooling it into an amorphous state. Since the reflectance at the crystal phase change recording layer 13 when a laser beam is incident on the optical disc is different from that at the amorphous phase change recording layer 13 when a laser beam is incident on the optical disc, the information of a recording mark is reproduced as an electrical signal by a photodetector, which detects the difference between the reflectances. On the other hand, information is erased by removing a recording mark by crystalizing the amorphous recording mark using an erasing pulse of low power.

In such a phase change optical disc, the size of a recording mark becomes smaller as the recording density increases. Where the size of a recording mark becomes smaller, crosstalk occurs between adjacent marks during reproduction of a signal, thus deteriorating the characteristics of the reproduced signal. Moreover, the resolving power for reproducing the signal becomes poor.

The resolving power for reproducing the signal of a phase change optical disc depends on the wavelength ($\lambda$) of a laser beam and numerical aperture (N.A.) of an object lens in an optical system. The characteristic of the reproduced signal is bad when the length of a recording mark (or a pit) formed on an optical disc is smaller than the value of $\lambda/(2\ N.A.)$, indicating a diffraction limit. The characteristic of the reproduced signal is good when the length of a recording mark (or a pit) formed on an optical disc is greater than the value of $\lambda/(2\ N.A.)$, indicating a diffraction limit. Accordingly, it is required to decrease the wavelength of a laser beam and to increase the numerical aperture of an objective lens for the purpose of recording information on a phase change optical disc at a high density.

However, there is a limit in decreasing the wavelength of a laser beam and in increasing the numerical aperture of an object lens. Particularly, a lens having little optical aberration is required to increase the numerical aperture of an object lens, but it is difficult to manufacture such a lens practically. Moreover, the lens having little optical aberration may cause skew in a disc and vibration, spoiling the stability of focus.

Accordingly, what is desired is a high resolution reproduction method for reproducing a signal of good quality by eliminating the signal of an adjacent mark, which is mixed into the signal of a pertinent mark, thereby realizing high density in a phase change optical disc.

SUMMARY OF THE INVENTION

To solve the above problem, an object of the present invention is to provide a high density phase change optical disc for obtaining a playback signal of good quality by eliminating the signal of an adjacent mark, which is mixed into the signal of a pertinent mark when optical information is reproduced from the optical recording medium, even if the size of a recording mark is reduced for realizing a high density optical medium.

Additional objects and advantages of the invention will be set forth in part in the description which follows and, in part, will be obvious from the description, or may be learned by practice of the invention.

To achieve the above object of the invention, there is provided a phase change optical disc including at least one first dielectric layer thinly formed on a transparent substrate; a phase change recording layer which converts between a crystal phase and an amorphous phase by irradiation with a recording beam; a reflective layer; and a phase control layer disposed between the substrate and the phase change recording layer, the phase control layer having two areas in which the irradiation with a reproduction beam causes a phase difference that alters the optical path of the reflected reproduction beam passing through the areas, the two areas being defined in a laser spot.

In a preferred embodiment of a phase change optical disc according to the present invention, on the transparent substrate are sequentially laminated the first dielectric layer, the phase control layer having two areas in which the irradiation with a reproduction beam causes a phase difference that alters the optical path of the reflected reproduction beam passing through the areas, the two areas being defined in a laser spot, a second dielectric layer, the phase change recording layer, which converts between a crystal phase and an amorphous phase by irradiation with a recording beam, a third dielectric layer, the reflective layer, and a protective layer.

It is preferable that the phase difference of the reflected reproducing beam caused by irradiation of the phase control layer substantially has a minimum value of 0 degrees in one of the two areas defined on the phase control layer, and a maximum value of 180 degrees in the other area. The phase control layer is formed of a phase change material which converts between a crystal phase and an amorphous phase or converts from a crystal phase of one structure to a crystal phase of another structure. Preferably, the phase control layer is formed of a material selected among the GeSbTe family, InSbTe family, AgInSb family, Au, and Ni.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
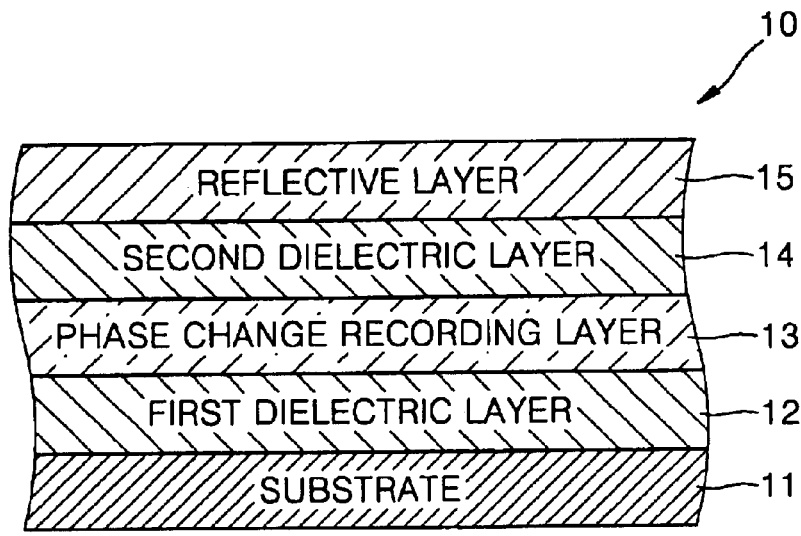
FIG. 1 is a schematic vertical sectional view of a conventional phase change optical disc.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
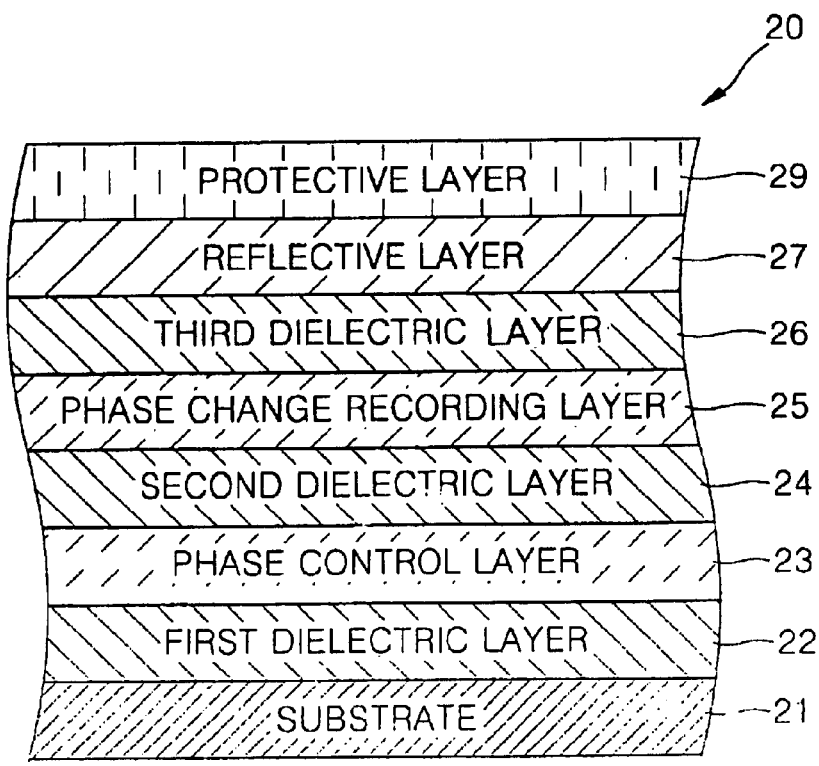
FIG. 2 is a schematic vertical sectional view of a phase change optical disc according to an embodiment of the present invention.

Referring to FIG. 2, a phase change optical disc 20 according to an embodiment of the present invention has a multilayer structure in which a first dielectric layer 22, a phase control layer 23, a second dielectric layer 24, a phase change recording layer 25, a third dielectric layer 26, a reflective layer 27 and a protective layer 29 are sequentially laminated on a transparent substrate 21, which is formed of, for example, a transparent acrylic acid resin material or a polycarbonate material.

Figure 3:
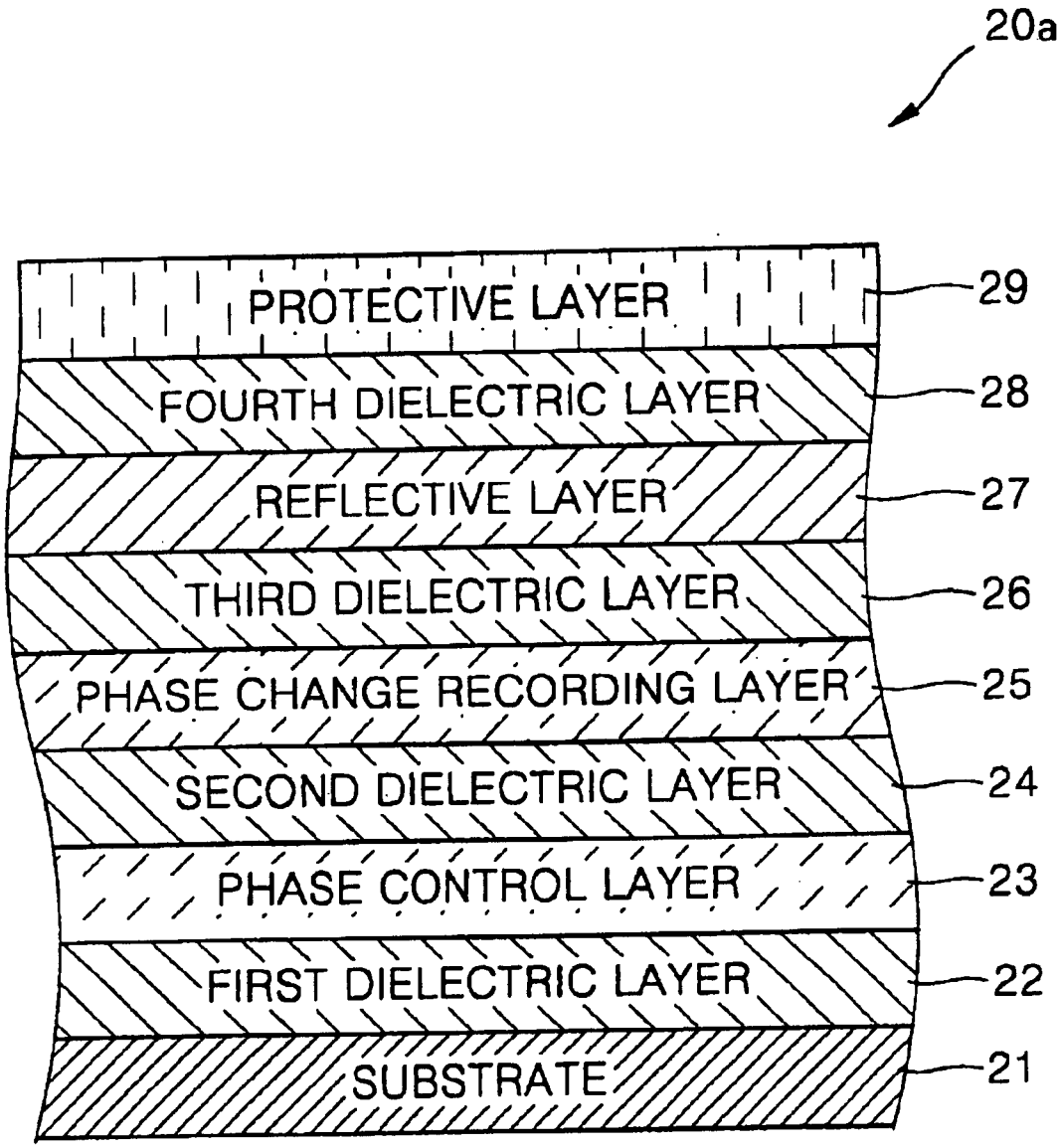
FIG. 3 is a schematic vertical sectional view of a phase change optical disc according to another embodiment of the present invention.

Alternatively, as another embodiment of the present invention, an optical disc 20a, as shown in FIG. 3, further includes a fourth dielectric layer 28 between the reflective layer 27 and the protective layer 29 in the multilayer structure shown in FIG. 2.

Figure 4:
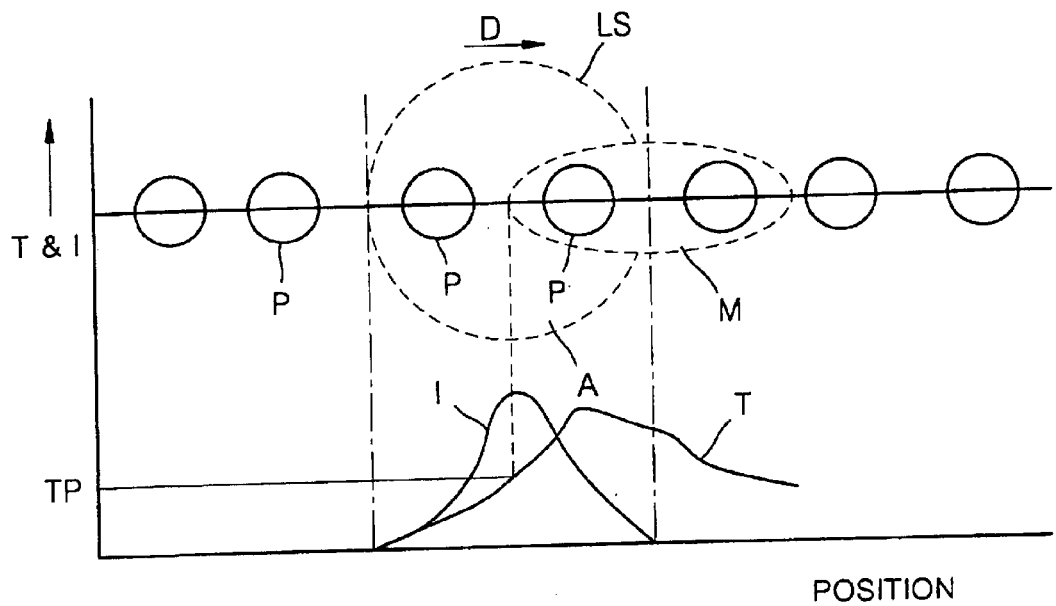
FIG. 4 is a diagram illustrating the distribution of intensity of an optical spot and the distribution of temperature on an optical disc to explain the effects of a phase change optical disc according to the present invention.

According to the present invention, the phase control layer 23 has a distribution of temperature as shown in FIG. 4 when a reproduction beam of high power is applied thereon. According to this distribution of temperature, the phase control layer 23 can be divided into a low temperature area and a high temperature area on the basis of a transition point TP. Since refractivity varies with the temperature, a different phase difference for light passing through the phase control layer 23 occurs in each area. In each area, the phase difference is between the reflected reproduction beam incident to the area, and the refracted reflected reproduction beam passing through the area. In other words, the high temperature area becomes a mask area, and the low temperature area becomes an aperture area.

In the mask area, the reflectance of a recording mark is the same as that of the peripheral space, and the phase difference is 0 degrees. Therefore, within the mask area, essentially none of the reproduction beam incident to the phase change recording layer is reflected through the mask area. In the aperture area, the reflectance of a recording mark is the same as that of the peripheral space, and the phase difference is 180 degrees. Therefore, in the aperture area, the reproduction beam incident to the phase change recording layer is maximally reflected through the aperture area.

As described above, a phase difference for light passing through the phase control layer occurs in two areas due to irradiation, and thus two areas in which the optical path of the reproduction beam changes are defined in a laser spot. The phase difference substantially has a minimum value of 0 degrees in one of the two areas, and a maximum value of 180 degrees in the other area.

The phase control layer 23 is formed of phase change material, such as a compound from the GeSbTe family, InSbTe family, AgInSbTe family, Au, or Ni. The phase change material reversibly converts between a crystal phase and an amorphous phase, or converts from a crystal phase of one structure to a crystal phase of another structure by irradiation with a reproducing beam.

The phase change recording layer 25 is formed of material, such as a compound from the GeSbTe family, the InSbTe family, or the AgInSbTe family. This material reversibly converts between a crystal phase and an amorphous phase by irradiation with a recording beam.

The first through third dielectric layers 22, 24 and 26 are usually formed of a material having a low refractivity to correlatively control the light absorptances and reflectances of the crystalline and amorphous phases of the phase change recording layer 25. Preferably, each of these layers 22, 24 and 26 may be formed of $Al_2O_3$, $ZnS—SiO_2$, $Si_3N_4$, $SiO_2$, $MgF_2$, $NaF_2$, $LiF_2$, $CaF_2$, or $AlF_2$.

The reflective layer 27 is formed of metal of excellent quality, for example, Al, a compound from the Al—Ti family, Cu, Au or an alloy thereof.

According to a phase change optical disc 20 and 20a of the present invention having a multilayer structure as described above, information is recorded by generating a recording mark. The recording mark is created by melting the phase change recording layer 25, which is initialized to a crystal phase by laser beam irradiation, using a recording pulse of high power, and then cooling it into an amorphous state.

During reproduction of information, the refractivity of the phase control layer 23 changes due to an increase in temperature, which results from the irradiation with a reproduction beam. The refractivity creates a phase difference, thus changing the optical path of the reproduction beam reflected from the phase change recording layer 25. As a result, two local areas are defined within the spot LS of the reproduction beam where the phase difference occurs, as shown in FIG. 4. In other words, a mask area M and an aperture area A are defined, and the phase difference of a reflected reproduction beam in each area makes it possible to reproduce the information of the recording mark (or pit).

The recording mark P in the mask area M has the same reflectance as a peripheral space and has a phase difference of 0 degrees, thereby making a mask effect. However, while it is ideal that the amount of reflected reproduction beam passing through the mask area M is 0, in actuality, a little amount of reflected reproduction beam does pass through the mask area M.

The recording mark P in the aperture area A has the same reflectance as a peripheral space and has a phase difference of 180 degrees. Thus the amount of the incident reproduction beam which is reflected becomes maximum. Accordingly, the signal of the reflected beam from the aperture area A is read, and thus only the information of the recording mark P in the aperture area A is read, thereby implementing reproduction. This makes it possible to use the reflected beam from only the partial spot area (i.e., aperture area) of a reproduction beam so that the size of the effective spot of a reproduction beam can be reduced.

As described above, according to a phase change optical disc, a phase difference with respect to a reflected reproduction beam occurs in the mask area and the aperture area within a laser spot on a phase control layer when a reproduction beam is incident, and the information of a recording mark can be reproduced due to the phase difference. Therefore, the size of the effective spot of a reproduction beam can be reduced. Accordingly, the mixing of the signals between the adjacent marks or the adjacent tracks is decreased, and influence of cross-talk is also decreased, thereby realizing a high density optical disc and improving the resolution power of a reproduction signal.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A phase change optical disc compatible with a recording beam and a reproducing beam, comprising:
    a transparent substrate;
    at least one first dielectric layer thinly formed on said transparent substrate;
    a phase change recording layer which converts between the crystal phase and the amorphous phase by irradiation with the recording beam;
    a reflective layer; and
    a phase control layer disposed between said transparent substrate and said phase change recording layer, said phase control layer having two areas defined in a laser spot, the laser spot defined by where the reproducing beam is incident to said phase control layer,
    wherein:
        the irradiation with the reproducing beam of said phase control layer within the laser spot causes a phase difference due to one of the two areas changing between a crystal and an amorphous phase that alters an optical path of the reproducing beam reflected from said phase change recording layer so as to prevent portions of the reproducing beam reflected from said phase change recording layer from passing through the one area that has converted between the crystalline and the amorphous state,
        said phase change recording layer does not change phases when irradiated by the reproducing beam,
        the recording beam has a different optical power as compared to the reproducing beam, and
        the phase control layer comprises a material selected from the group consisting essentially of GeSbTe, InSbTe, and Ni.

2. The phase change optical disc of claim 1, further comprising:
    a second dielectric layer;
    a third dielectric layer; and
    a protective layer;
    wherein said first dielectric layer, said phase control layer, said second dielectric layer, said phase change recording layer, said third dielectric layer, said reflective layer, and said protective layer are sequentially laminated on said transparent substrate.

3. The phase change optical disc of claim 2, further comprising a fourth dielectric layer disposed between said reflective layer and said protective layer.

4. The phase change optical disc of claim 3, wherein one of the two areas defined on said phase control layer has a phase difference, which alters an optical path of the reproducing beam reflected from said phase change recording layer, that substantially has a minimum value of 0 degrees, and the other area has a phase difference, which alters an optical path of the reproducing beam reflected from said phase change recording layer, that substantially has a maximum value of 180 degrees.

5. The phase change optical disc of claim 2, wherein one of the two areas defined on said phase control layer has a phase difference, which alters an optical path of the reproducing beam reflected from said phase change recording layer, that substantially has a minimum value of 0 degrees, and the other area has a phase difference, which alters an optical path of the reproducing beam reflected from said phase change recording layer, that substantially has a maximum value of 180 degrees.

6. The phase change optical disc of claim 2, wherein each of said first, second, and third dielectric layers is formed of a material selected from the group consisting essentially of $Al_2O_3$, $ZnS$—$SiO_2$, $Si_3N_4$, $SiO_2$, $MgF_2$, $NaF_2$, $LiF_2$, $CaF_2$, and $AlF_2$.

7. The phase change optical disc of claim 2, wherein said phase change recording layer comprises a material selected from the group consisting essentially of GeSbTe, InSbTe, and AgInSbTe.

8. The phase change optical disc of claim 1, wherein one of the two areas defined on said phase control layer has a phase difference, which alters an optical path of the reproducing beam reflected from said phase change recording layer, that substantially has a minimum value of 0 degrees, and the other area has a phase difference, which alters an optical path of the reproducing beam reflected from said phase change recording layer, that has a maximum value of 180 degrees.

9. The phase change optical disc of claim 1, wherein said phase change recording layer comprises a material selected from the group consisting essentially of GeSbTe, InSbTe, and AgInSbTe.

10. The phase change optical disc of claim 1, wherein each of said first, second, and third dielectric layers is formed of a material selected from the group consisting essentially of $Al_2O_3$, $ZnS$—$SiO_2$, $Si_3N_4$, $SiO_2$, $MgF_2$, $NaF_2$, $LiF_2$, $CaF_2$, and $AlF_2$.

11. The phase change optical disc of claim 1, wherein said reflective layer is formed of a material selected from the group consisting essentially of Al, Al—Ti, Cu, Au, and alloys of any of the above.

12. A phase change optical disc compatible with a recording beam and having multiple layers formed on a transparent substrate, the multiple layers including a reflective layer, comprising:

a phase change recording layer which converts between the crystal phase and the amorphous phase by irradiation with the recording beam; and a phase control layer disposed between the transparent substrate and said phase change recording layer, said phase control layer having a plurality of areas defined in a laser spot, the laser spot defined by where the reproducing beam is incident to said phase control layer, wherein:

the irradiation of the laser spot on said phase control layer with the reproducing beam causes a phase difference in the plurality of areas on said phase control layer due to ones of the plurality of areas being converted between a crystalline and an amorphous state that alters an optical path of the reproducing beam reflected from said phase change recording layer so as to prevent portions of the reproducing beam reflected from said phase change recording layer from passing through the ones of the areas that have converted between the crystalline and the amorphous state, said phase change recording layer does not change phases when irradiated by the reproducing beam, the recording beam has a different optical power as compared to the reproducing beam, and the phase control layer comprises a material selected from the group consisting essentially of GeSbTe, InSbTe, and Ni.

13. The phase change optical disc of claim 12, wherein a material that forms said phase control layer defines the plurality of areas based upon a temperature profile of the material during irradiation by the reproduction beam.

14. The phase change optical disc of claim 12, wherein the plurality of areas comprise at least one area that has a phase difference, which alters an optical path of the reproducing beam reflected from said phase change recording layer, that substantially has a value of 0 degrees, and at least one other area which has a phase difference, which alters an optical path of the reproducing beam reflected from said phase change recording layer, that substantially which substantially has a value of 180 degrees.

15. An optical disc compatible with a reproducing beam and having multiple layers formed on a transparent substrate, comprising:

a recording layer having recording marks to be reproduced using the reproducing beam forming a first laser spot on said recording layer; and a phase control layer disposed between the transparent substrate and said recording layer upon which the reproducing beam forms a second laser spot, wherein:

the irradiation of the second laser spot on said phase control layer causes one area of said phase control layer within the second laser spot to be converted between a crystalline and an amorphous state so as to alter an optical path of a portion of the reproducing beam received at the recording layer such that the second laser spot is larger than the first laser spot, and the phase control layer comprises a material selected from the group consisting essentially of GeSbTe, InSbTe, and Ni.

* * * * *

UNITED STATES PATENT AND TRADEMARK OFFICE
CERTIFICATE OF CORRECTION

PATENT NO.   : 6,835,531 B1
DATED        : December 28, 2004
INVENTOR(S)  : Du-seop Yoon et al.

It is certified that error appears in the above-identified patent and that said Letters Patent is hereby corrected as shown below:

<u>Column 6,</u>
Lines 1-3, delete "comprises a material selected from the group consisting essentially of GeSbTe, InSbTe, and" and insert -- is --.

<u>Column 7,</u>
Lines 27-29, delete "comprises a material selected from the group consisting essentially of GeSbTe, InSbTe, and" and insert -- is --.

<u>Column 8,</u>
Lines 28-30, delete "comprises a material selected from the group consisting essentially of GeSbTe, InSbTe, and" and insert -- is --.

Signed and Sealed this

Seventeenth Day of May, 2005

JON W. DUDAS
*Director of the United States Patent and Trademark Office*